No. 798,575. PATENTED AUG. 29, 1905.
F. K. EASTMAN.
FISHING DEVICE.
APPLICATION FILED SEPT. 20, 1904.

Witnesses
Edwin F. McKee
W. H. Clarke.

Inventor
Floyd K. Eastman
By Victor J. Evans
Attorney

UNITED STATES PATENT OFFICE.

FLOYD K. EASTMAN, OF MANCELONA, MICHIGAN.

FISHING DEVICE.

No. 798,575.      Specification of Letters Patent.      Patented Aug. 29, 1905.

Application filed September 20, 1904. Serial No. 225,252.

*To all whom it may concern:*

Be it known that I, FLOYD K. EASTMAN, a citizen of the United States, residing at Mancelona, in the county of Antrim and State of Michigan, have invented new and useful Improvements in Fishing Devices, of which the following is a specification.

This invention relates to fishing devices.

While fishing in shallow streams, ponds, and the like anglers often experience difficulty in preventing their tackle from becoming entangled in weeds or marine grass, which has a tendency not only to clog the hook, but also to interfere with the rotation of the spoon or other spinning device in trolling.

The object of the present invention is to avoid the clogging of the hook or spoon with weeds and the like.

With the foregoing and other minor objects in view, which will appear as the description proceeds, the invention resides in the combination and arrangement of parts and in the details of construction hereinafter described and claimed as a practical embodiment thereof.

Figure 1:
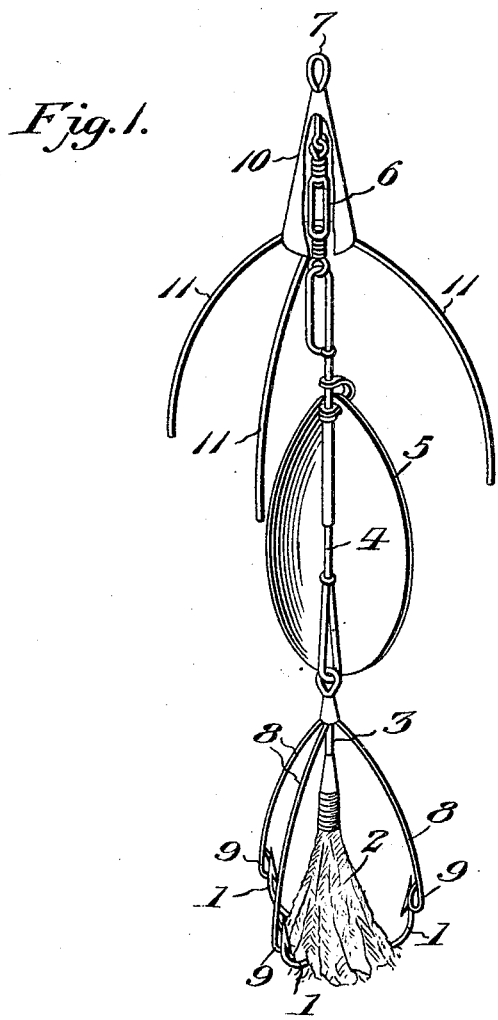
Figure 2:
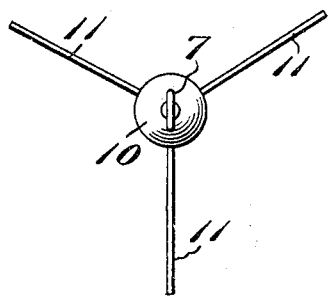

In the accompanying drawings, forming part of this specification, Figure 1 is a perspective view of a device constructed in accordance with the invention. Fig. 2 is a plan view thereof.

Like reference-numerals indicate corresponding parts in the two figures.

The reference-numerals 1 1 1 indicate the fish-hooks; 2, the bait; 3, the shank of the hooks; 4, the shank of the spoon to which the shank of the hooks is attached; 5, the spoon, and 6 the swivel-joint connecting the shank 4 and the loop 7, by means of which the device is attached to a fish-line.

The elements thus far described may be of any suitable form and construction. As previously indicated, the invention resides particularly in improved means for preventing the fish-hooks or spoon from becoming entangled or clogged with weeds and the like.

With this object in view a plurality of hook or weed guards 8 8 8, each having a looped end 9, is fastened in any suitable manner to the shank 3, each of the fish-hooks having disposed adjacent thereto the free end of one of the guards 8. The hook-guards 8 preferably are constructed of spring or resilient material, for which reason, while they serve effectively to prevent the hooks from becoming entangled with weeds or marine growths, they are adapted to be forced inwardly toward the shank 3 when a fish strikes one of the hooks.

In order to prevent the spoon 5 or swivel-joint 6 from becoming entangled with weeds, a guard 10 is attached in any suitable manner adjacent to the loop 7. The guard 10 preferably is constructed in the shape of a cone, although for the purpose of illustration it has been partly broken away in Fig. 1. Attached in any suitable manner to the cone-shaped guard 10 is a plurality of guard members or arms 11, which extend radially with respect to the shank of the spoon, and thus serve to prevent weeds from becoming entangled therewith. If desired, the guard members 11 may be constructed of resilient material, although this is not essential.

Changes in the precise embodiment of invention illustrated and described may be made within the scope of the following claims without departing from the spirit of the invention or sacrificing any of its advantages.

Having thus described the invention, what is claimed is—

1. A fishing device comprising a hook, a spoon, a spoon-shank, an attaching-loop for the line, a swivel connection between the attaching-loop and spoon-shank, and a guard for said swivel connection.

2. A fishing device comprising a hook, a spoon, a spoon-shank, an attaching-loop for the line, a swivel connection between the attaching-loop and spoon-shank, a cone-shaped guard connected with the attaching-loop and surrounding the swivel connection, and a plurality of guard-arms attached to the cone-shaped guard.

3. A fishing device, comprising a plurality of hooks, having a single shank, a plurality of resilient weed-guards attached to said shank, and each having its free end looped and disposed adjacent to one of the hooks, a spoon having a shank connected with the shank of the hooks, an attaching-loop for the line, a swivel connection between the shank of the spoon and the attaching-loop, a cone-shaped weed-guard covering the swivel connection and connected with the attaching-loop, and a plurality of radial guard-arms connected with the cone-shaped weed-guard.

In testimony whereof I affix my signature in presence of two witnesses.

FLOYD K. EASTMAN.

Witnesses:
   W. A. BROOKS,
   WM. E. NEELAND.